106. COMPOSITIONS, COATING OR PLASTIC

84

Patented June 23, 1942

2,287,411

UNITED STATES PATENT OFFICE 2,287,411

ADHESIVE

Ernest R. Boller, Twinsburg Township, Summit County, and Raymond F. Remler, Lakewood, Ohio, assignors to E. I. du Pont de Nemours & Company, Wilmington, Del., a corporation of Delaware No Drawing. Application December 19, 1940, Serial No. 370,806

4 Claims. (Cl. 106—84)

This invention relates to adhesives, and more particularly to china clay-silicate adhesives having improved stability and rheological properties and to processes in which such adhesives are produced by mixing china clay with water and dissolving sodium silicate glass in the mixture at a temperature of about from 115 to 162° C. and under a superatmospheric pressure of about from 10 to 80 pounds per square inch.

The incorporation of clays into sodium silicate solutions has been proposed for various purposes and particularly to improve the suitability of such solutions as corrugated fibreboard adhesives. Stable suspensions of bentonitic clays in silicate solutions may be prepared without difficulty, but such suspensions do not possess the properties desired in a paperboard adhesive. Suspensions of china clays in sodium silicate solutions, on the other hand, have more desirable adhesive properties, but unfortunately the china clay tends to settle out of such suspensions, causing considerable difficulty in their use. Some improvements have been made in the direction of producing more stable suspensions of china clay in silicate solution, but these improvements have not completely solved the problem. Many methods proposed for improving the stability of china clay-silicate suspensions adversely affect the rheological properties of the suspension and otherwise detract from their suitability as adhesives particularly for fibreboard manufacture.

Now we have found that china clay-silicate adhesives having improved stability and rheological properties may be produced by mixing china clay with water and dissolving sodium silicate glass in the mixture at a temperature of about from 115 to 162° C. and under a superatmospheric pressure of about from 10 to 80 pounds per square inch.

The stability of a suspension of clay in sodium silicate solution is readily determinable by permitting a portion of the suspension to stand quiescent for a suitable period of time and then measuring the concentration of clay in a lower portion of the mixture and comparing this with the concentration of clay in the original uniform mixture, any increase indicating a proportionate amount of settling. By such a test the china clay-silicate adhesives of our invention are characterized by a high degree of stability as compared with china clay-silicate suspensions heretofore available.

The importance of the rheological properties of clay-silicate adhesives has heretofore been commonly overlooked, with the result that clay-silicate mixtures have been proposed for use as adhesives despite the fact that their rheological properties were not well adapted for this purpose.

The rheological properties, that is, the flow characteristics, of a clay-silicate solution determine its suitability as an adhesive, particularly for use in the manufacture of corrugated fibreboard on high-speed boxboard machines. Such machines require an adhesive which does not separate upon standing in storage tanks and which can easily be pumped thru pipes to its point of application. The adhesive must be readily applicable to the corrugated medium by means of an applicator roll. It must have sufficient body to remain momentarily where placed upon the tips of the corrugations, and it must set up almost instantaneously when contact is effected between the corrugated medium containing the adhesive and the corrugated board liner. The rheological properties possessed by a particular clay-silicate adhesive will determine how well the adhesive answers these requirements.

Certain rheological properties are of particular importance in a boxboard adhesive. One of these is the yield value, which is the shearing stress required, as dynes per square centimeter, to initiate flow. Another is the coefficient of mobility, which is the slope of the curve of average rate of flow plotted against the applied stress and is expressed in rhes. Another important property is thixotropy which is defined as a decrease in apparent viscosity effected by agitation, and is measured in the following manner:

Using a calibrated Stormer viscometer, the calibration equation of which is of the type:

$$\eta = K(W-\beta)t$$

where $\eta$ = viscosity, poises
$K$ = calibration constant
$W$ = weight on Stormer cord
$\beta$ = frictional correction, dependent on $t$, and found by calibration at various values of $W$ and $t$.
$t$ = time required for 100 revolutions of cylinder of machine and with a weight of 100 grams on the cord, the time elapsed for each 5 revolution interval in a 100 revolution determination is measured. These times are multiplied by 20 and put into the calibration equation, and the corresponding viscosities calculated. The viscosities are plotted on logarithmic paper against the total number of revolutions occurring up to the end of the interval in which the viscosity was measured; that is, the average viscosity for, say, the interval between 35 and 40 total revolutions is plotted against 40 revolutions. The best curve is drawn thru the plotted points. The apparent average viscosity is read from the curve at 10 and 100 total revolutions, and the former is divided by the latter giving a value designated as "thixotropic ratio." In a non-thixotropic material, the ratio found is 1.00. In a thixotropic material, the ratio found is greater than 1.00.

Silicate-clay mixtures behave as soft or plastic solids, that is, they have a definite yield value, below which flow does not occur. In the ideal case proposed by Bingham, above the yield value equal increments of shearing stress produce equal increments of rate of flow. Mathematically $$D = M(S - Y)$$

where D is the rate of flow, M is the coefficient of mobility, S is the shearing stress, and Y is the yield value. The mobility in plastic flow is analogous to the fluidity in flow of true liquids. There is no plastic flow analogue of viscosity. It is to be noted that in case of a true liquid, a measurement of rate of flow at a single value of shearing stress is sufficient to determine the viscosity. In case of a plastic system, however, at least two measurements, at different stresses, are required, in order to determine the slope of the stress-flow curve (the mobility coefficient) and its intersection with the stress axis (the yield value). In such a system the apparent viscosity, defined as shearing stress divided by rate of flow as observed in measurements at a single stress value, decreases from exceedingly high values at stresses just above the yield value, to values approaching the reciprocal of the mobility at very high stresses.

An important property already discussed is the stability ratio, which is the ratio between the analyzed per cent of clay in the bottom 8 per cent of a settling test cylinder after one week's storage at 90° F. and the analyzed per cent clay in the whole well-mixed sample before settling. A still further important property is the rate of set, which is a measure of the force in ounces required to pull a liner 3 inches wide from a corrugated medium of the same width and to which the liner is fastened with the clay-silicate adhesive, after a specified time allowed for setting of the adhesive.

In the clay-silicate adhesives of our invention, the above-described rheological properties are such that the adhesives are particularly well adapted for use on high-speed fibreboard machines, and the clay is dispersed in the silicate with such stability that the adhesives may be shipped and stored without difficulty due to settling out of the clay.

When preparing a clay-silicate adhesive of our invention, the constituents employed may be selected with a view to producing the desired properties in the ultimate product. The basis for such selection will become clear from the description which follows:

As the silicate, there may be selected a sodium silicate having a weight ratio of $SiO_2:Na_2O$ of about from 3.0 to 4.0, while more particularly it will be preferred to use sodium silicate having an $SiO_2:Na_2O$ weight ratio of from about 3.2 to 3.4. If sodium silicate having a ratio less than 3.0 is employed, the rate of set of the adhesive is ordinarily retarded. Sodium silicate having a ratio higher than 4.0, on the other hand, is difficult to prepare and is unstable. Within the preferred ratio range, sodium silicate having a 3.25 ratio is easily available and especially well-suited to the purpose.

The relative proportions of water and sodium silicate glass used should be such as to give an ultimate product having a specific gravity of about from 35 to 45.0° Bé. after all the glass has dissolved with the clay present. More particularly, it is preferred that this specific gravity be from about 40 to 42.0° Bé. If dissolution of the silicate glass is effected in a pressure vessel under external heating, the amount of water initially added to the vessel should be that calculated to give a solution of the desired gravity for the amount of glass used. On the other hand, if the dissolution is effected in a pressure vessel which is heated by admitting steam to it, so that condensation of the steam takes place within the vessel, the amount of water initially used should be the amount calculated to give the desired gravity less the amount of water which will be introduced by condensation of steam.

The clay used may be of the kaolin type commonly known by the name china clay or ball clay. The clay may be used in the proportion of 1 part of clay for from 1.6 to 12 parts of glass with 1 part of clay for 7 to 11 parts of glass to be preferred.

The clay-silicate adhesive of our invention may be modified by incorporating therein various addition agents such as starch, fillers of various kinds, and wetting and penetrating agents. Such modifying agents may be used for the purposes for which they have already been employed by the art in conjunction with sodium silicate adhesives which do not contain clay.

As already pointed out, we have found that an apparently necessary condition to the stability of clay suspensions in sodium silicate solutions is that the clay and silicate be admixed under elevated temperatures and pressures, the admixture being effected by dissolving sodium silicate glass in a mixture of the clay with water under such pressure and temperature conditions. It seems likely that there is a correlation between the pressure and the temperature which we prefer to use, since to attain the elevated temperatures desirable it is necessary to confine the liquid in a manner such that pressure is generated. On the other hand, the pressure may be due in part to the presence in the pressure vessel of gases other than water vapor so that the pressure may be greater than that corresponding to the vapor pressure of water at the given temperature. Ordinary we prefer to avoid the presence of such other gases by venting them from the pressure vessel before closing the vessel and building up the pressure.

To give a clay-silicate suspension of desirable stability, the silicate should be dissolved in the clay-water mixture at a temperature of from 115 to 162° C. and a pressure of about from 10 to 80 pounds gauge. Outside of these limits the desired stability is not achieved, and the clay does not exert its maximum effect upon the rheological properties of the mixture. Within this range it is preferred to use a temperature of from about 138 to 145° C. and a pressure of from about 50 to 60 pounds gauge. It is desirable that the clay-water mixture be agitated during the dissolution of the sodium silicate therein. This may readily be accomplished by carrying out the dissolution in a rotating autoclave, preferably while using glass of such a size as will not agglomerate. Thus, the use of powdered glass is undesirable, because at the elevated temperatures employed the powdered glass softens and agglomerates into an unstirrable mass. On the other hand, it is desirable that the glass be in a divided state since the presence of large lumps would unduly prolong the time required for dissolution. A silicate glass capable of passing thru a ¼- or ½-inch screen is particularly well suited to the processes.

The compositions of our invention may have a clay content of from 3 to 15 per cent by weight and a sodium silicate solids content of 25 to 35 per cent by weight. They may have a stability ratio of from about 1.1 to 1.7, such ratios being lower than for the clay-silicate adhesives heretofore available and indicating a substantially decreased tendency toward settling out of the clay. The compositions of our invention may have a yield value of from 25 to 150 dynes per square centimeter, a coefficient of mobility of from 0.3 to 3.5 rhes and a thixotropy ratio from 1.10 to 1.40, the yield value and coefficients of mobility and thixotropic ratio for a particular adhesive being such, relative to each other, that the adhesive is particularly well suited for use on a high-speed paperboard machine.

The consistency or rheological properties of silicate-clay suspensions are extremely important in their use as fiberboard adhesives. The adhesives must possess a yield value in the proper range so that they will stand up on the flutes of the corrugations during properation of the board, that is under a low stress they should act as solids and remain stationary. The yield value, however, must not be too great or it will require an undue expenditure of power to cause the adhesives to flow thru pipes, thru the machine set-up, etc. The mobility must also be properly adjusted so that the adhesive after having been put into motion will readily flow thru the pipes. The yield value and the thixotropic ratio must be such that the adhesives possess good stability and prevent handling difficulties due to settling. With a thixotropic ratio in the proper range the adhesives will act as a solid or gel on absence of agitation and in this manner suspend the clay so that little settling will occur. Each of these rheological characteristics are of importance and they must be properly adjusted so that the performance of the adhesive will be satisfactory.

The mobility of adhesives prepared according to processes of our invention will vary with a variation in the clay content, but the relationship between mobility and clay content will always be such that the reciprocal of the mobility, in rhes, will be greater than about 0.3 for each per cent of clay in the product.

It will be seen, therefore, that the china clay-silicate adhesives of our invention are of improved stability and rheological properties and that they are characteristic of products produced by dissolving sodium silicate glass in a china clay-water suspension at a temperature of about from 115 to 162° C. and under a superatmospheric pressure of about from 10 to 80 pounds gauge.

The foregoing description of our invention is further illustrated in the following example which is not to be construed as limiting upon the processes and products described.

Example

Into a rotary pressure dissolver there was placed 1790 parts by weight of water, 215 parts of china clay and 1400 parts of anhydrous sodium silicate glass having a 3.25 $SiO_2/Na_2O$ weight ratio and crushed so as to pass a ¼-inch mesh screen. The dissolver was caused to rotate and steam was introduced under pressure directly into the dissolver in a manner such that condensate of the steam would remain in the dissolver. Inert gases were vented from the dissolver, and the pressure was built up to 10 pounds per square inch gauge, the temperature rising to 115° C. The pressure of the steam was then increased to 56 pounds gauge for a period of 1¼ hours, the temperature being maintained at 150.9° C. during this time. The pressure was then released and the product was discharged from the dissolver. It was found that the silicate glass had been completely dissolved.

The product had a clay content of 4.1 per cent by weight and a sodium silicate solids content of 26.7 per cent by weight. Its stability ratio was 1.5, its yield value was 32 dynes per square centimeter, its coefficient of mobility was 0.33 rhe, and its thixotropy ratio was 1.30. The rate of set, determined as already described, is shown in the following table in comparison with the rate of set of a 40.5° Bé., 3.25 ratio sodium silicate solution representative of an unmodified silicate solution commonly used on boxboard machines.

| Force in ounces required to rupture a bond after elapsed time of— | Adhesive of example | 40.5° Bé. sodium silicate solution |
|---|---|---|
| *Seconds* | | |
| 30 | 25 | 24 |
| 60 | 34 | 30 |
| 90 | 37 | 28 |
| 120 | 38 | 31 |
| 180 | 51 | 38 |

While we have shown certain compositions and processes, it will be understood that one skilled in the art may without departing from the spirit of this invention devise numerous processes and produce numerous clay-silicate compositions.

We claim:

1. In a process for producing china clay-silicate adhesives the step comprising effecting admixture of sodium silicate with china clay in an aqueous medium at a temperature of from about 115 to 162° C. and a super-atmospheric pressure of from about 10 to 80 pounds per square inch, the proportions of water and sodium silicate glass being such as to give an ultimate product having a specific gravity of about from 35 to 45° Bé. after all the glass has dissolved with the clay present, and the clay being present in the proportion of one part of clay for about from 1.6 to 12 parts of glass.

2. In a process for producing a china clay-silicate adhesive, the step comprising mixing china clay with water and thereafter dissolving sodium silicate glass in the mixture at a temperature of from about 115 to 162° C. and under a super-atmospheric pressure of about from 10 to 80 pounds per square inch, the proportions of water and sodium silicate glass being such as to give an ultimate product having a specific gravity of about from 35 to 45° Bé. after all the glass has dissolved with the clay present, and the clay being present in the proportion of one part of clay for about from 1.6 to 12 parts of glass.

3. In a process for producing a china clay-silicate adhesive, the steps comprising mixing china clay and water in the proportion of about from 5.0 to 25.0 parts clay per 100 parts water and dissolving therein a sodium silicate glass having an $SiO_2/Na_2O$ weight ratio of from about 3 to about 4 at a temperature of from about 115 to 162° C. and under a super-atmospheric pressure of from about 10 to 80 pounds per square inch, the proportion of glass being from about 41.0 to 56.0 parts by weight per 100 parts of water.

4. An adhesive composition comprising a suspension of from about 3 to 15 per cent by weight of clay in an aqueous sodium silicate solution in which the sodium silicate has an $SiO_2/Na_2O$ weight ratio of from about 3 to about 4, the composition having a stability ratio of from about 1.0 to 1.7, a yield value of from about 25 to 150, a thixotropy ratio of from about 1.10 to 1.40, and a coefficient of mobility of from about 0.3 to 3.5 rhes, the reciprocal of the mobility, in rhes, being greater than about 0.3 for each per cent of clay in the composition.

ERNEST R. BOLLER.
RAYMOND F. REMLER.